Sept. 11, 1962 W. R. CALVERT 3,053,773
METHOD OF REJUVENATING AN EXHAUST PURIFIER
Filed Nov. 9, 1959
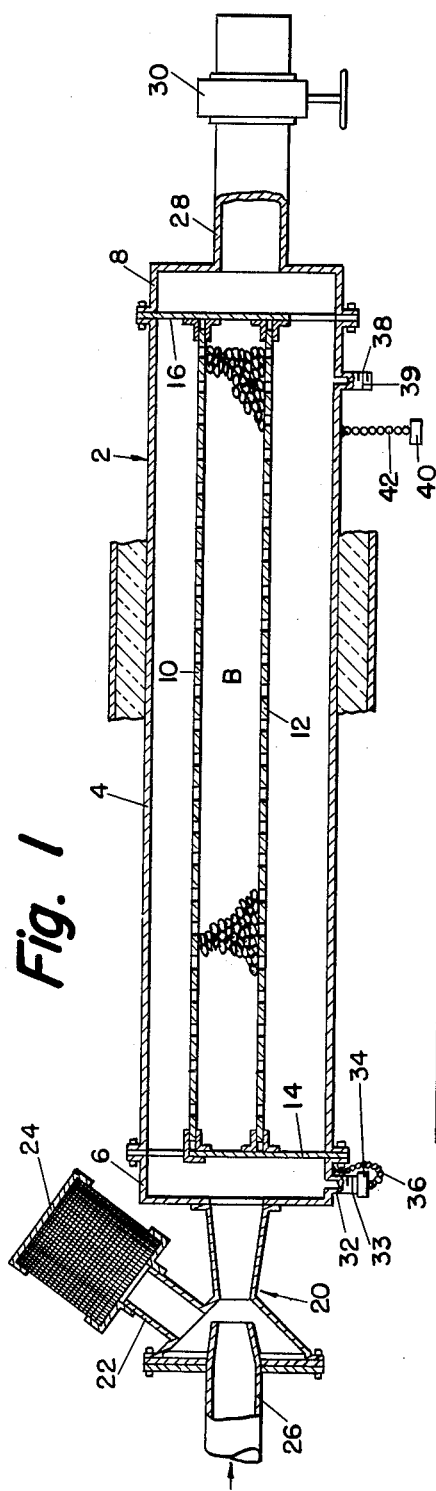
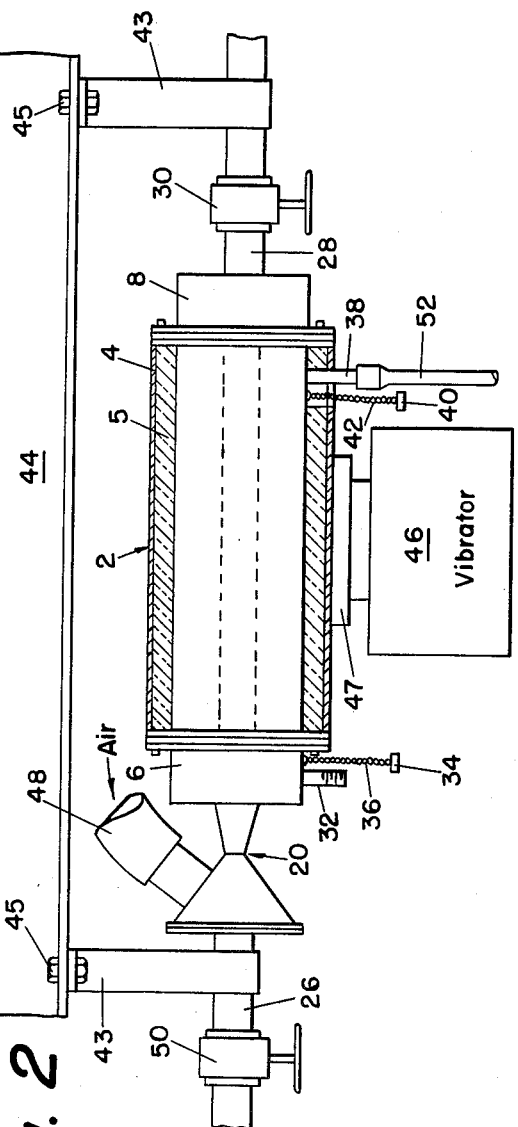
INVENTOR.
WILLARD R. CALVERT
BY
ATTORNEY United States Patent Office 3,053,773
Patented Sept. 11, 1962

3,053,773
METHOD OF REJUVENATING AN
EXHAUST PURIFIER
Willard R. Calvert, Ridley Park, Pa., assignor to Oxy-Catalyst, Inc., Wayne, Pa., a corporation of Pennsylvania
Filed Nov. 9, 1959, Ser. No. 851,717
13 Claims. (Cl. 252—412)

This invention relates to the rejuvenation of catalytic exhaust purifiers of the type employed with internal combustion engines which employ leaded gasoline.

Of late years, the almost universal use of so-called "leaded" gasolines has increased the difficulty of purification of exhaust gases both by introducing another undesirable contaminant in the exhaust gases in the form of lead compounds formed in the engine and exhausted therefrom, and by increasing the difficulty of purifying the gases by means of catalytic oxidation. The term "leaded gasoline" as it is commonly used and as also used herein, refers to a gasoline to which has been added a compound of lead, most usually tetraethyl lead, for the purpose of increasing the octane rating of the gasoline. The tetraethyl lead, which is usually added together with halogenated compounds which inhibit the deposition of the lead on the cylinder walls, is added to the gasoline in relatively small amounts, such for example as the amount equivalent to 3 grams of metallic lead per gallon of gasoline. Under the combustion conditions prevailing in the engine, the lead oxide and other lead compounds which are formed are carried out of the engine in the exhaust gases. These compounds are for the most part lead oxide, tetraethyl lead and lead halides, such as lead chloride and lead bromide, and complexes of these compounds.

When a catalytic exhaust purifier containing a bed of oxidation catalyst is employed to catalytically oxidize, carbon monoxide, hydrocarbons and the organic constituents of the exhaust gases, these lead compounds tend to deposit upon and accumulate within the catalyst bed which is advantageous from the standpoint that the bed acts as a filter to remove these undesirable contaminants and prevent their escape to the atmosphere, but which is disadvantageous in that these compounds tend to reduce the oxidation activity of the catalyst and eventually render it unable to carry on its intended function of oxidizing the undesirable oxidizable fumes.

In accordance with the present invention it has been found that it is possible in the operation of a catalytic purifier on engines using leaded gasoline, to periodically rejuvenate the catalytic purifier by a mechanical removal of catalyst particles and of the accumulated loose lead compounds which are in the form of dust and then treating the catalyst with a solution of the catalyst metal. Surprisingly this process restores the catalyst to essentially its original activity and insures free passage of the exhaust gases through perforations in the structure containing the catalyst.

The method in accordance with this invention is advantageous in that it can be carried out, if desired, without removing the exhaust purifier from its permanently installed position. It is further advantageous in that it greatly improves the step of replacing catalyst metal by preventing the clumping and other deleterious effects caused by the presence of the large amounts of catalyst dust and particles.

In accordance with this invention the catalytic purifier is first vibrated to dislodge dust and particles from the walls, from the catalyst bed and from the other internal structural parts of the catalytic purifier. Advantageously an entraining fluid, for example, a gas such as air or a liquid such as water, is passed through the interior of the catalytic purifier while it is being vibrated in order to entrain the dust and particles and remove them from the interior of the purifier. Alternatively, the vibration can be carried out first to dislodge the material to be entrained and the entraining fluid passed through the interior of the purifier subsequently to remove this material. The vibrations may be within a wide range for satisfactory results but will have preferably an amplitude of vibration of the entire purifier housing from about 1/1000" to about 1/3" and preferably will have a frequency of from about 60 to about 9000 vibrations per minute. Electrical, mechanical and sound vibrators may be employed. The vibration is not only of great value in cleaning the purifier and its catalyst but also is of importance in removing dust to facilitate the later employment of liquid reagents which otherwise would form the dust into interfering wet clumps.

A liquid solution, preferably an aqueous solution, of a decomposable compound of the catalyst metal employed on the catalyst in the purifier is then flowed into the catalyst in the purifier. Thus, for example, an aqueous solution of a water soluble salt of the appropriate metal preferably a salt of a strong acid, such as salts of inorganic acids, for example, a nitrate, sulfate or chloride salt, may be employed. Thus, an aqueous solution of copper nitrate and chromium nitrate made for example from hydrated copper nitrate ($Cu(NO_3)_2 \cdot 3H_2O$) and hydrated chromium nitrate ($Cr(NO_3)_3 \cdot 9H_2O$) or chromium trioxide in water is useful where the catalyst is a copper chrome catalyst. Aqueous solutions of the sulfates and chloride salts of copper and chromium are further exemplary. Similarly where platinum, nickel or silver is the catalyst metal, exemplary is an aqueous solution of a water soluble salt of the metal involved, such as a salt of a strong acid, such as nitric, hydrochloric or sulfuric.

This solution is permitted to remain in contact with the catalyst in the catalyst purifier until a substantial amount has been absorbed, normally from 2 to 30 minutes.

The remaining solution is then drained and the catalyst is dried and the metal salt is decomposed by passing the engine exhaust through the purifier preferably while running the automobile on the road. The drying and decomposing can, if desired, be carried out by passing any reducing gas such as a gaseous or vaporized fuel, for example, propane or city gas, through the purifier at a temperature in the range of 400° F. to 1000° F. Alternatively, the catalyst can be dried and partial decomposition to the metal oxide and possibly some metal accomplished by the use of hot air with the reduction carried out in a subsequent step by passing the aforementioned reducing gas through the purifier.

It is surprising that a high degree of rejuvenation is achieved by this method despite the fact that some of the lead compounds which adhere tightly to the catalyst are not removed by the vibration step.

While not essential, it is an advantage to vibrate the purifier also while the catalyst is being contacted by the solution of the metal compound where it is desired to insure that the entire surface of each catalyst pellet is uniformly treated.

If desired, an additional step can be employed to provide still better results. After the removal of the material dislodged by the vibration step by the passing of the entraining fluid through the purifier, an aqueous flushing solution can be flowed through the purifier.

Generally speaking any aqueous liquid reagent capable of dissolving and removing lead compounds may be employed where it is desired to remove lead compounds tightly adhering to the catalyst to provide a still better degree of rejuvenation. For example, water which preferably will be heated to a temperature in the range of from 150° F. to its boiling point may be employed. An aqueous solution of ammonium acetate containing up to 30% by weight of ammonium acetate at a temperature in the range of from 150° F. to its boiling point, and a hot aqueous solution of triethanolamine containing 5 to 50% by weight ethanolamine at a temperature in the range of 150° F. to its boiling point are very good examples. Aqueous solutions containing mineral or organic acids which form water soluble lead salts such as nitric or acetic acid, or aqueous salt solutions such as solutions of lead acetate, ammonium chloride, may be employed, the choice of a particular reagent being dictated by the type of oxidation catalyst employed and the comparative convenience and effectiveness of the various reagents. For a platinum type catalyst, for example, a relatively dilute solution such as a 5% or 10% solution of nitric acid is preferable since such a solution very effectively dissolves and removes the lead compounds with the solution at atmospheric temperatures and has a minimum corrosive effect upon the steel components of the exhaust purifier with which it may come in contact. In cases where the purifier contains unprotected carbon steel components with which the reagents may come in contact, the use of corrosive hydrochloric acid solutions or chloride solutions is preferably avoided. With other types of catalysts, such as an activated alumina pellet impregnated with a combination of metals such as copper-chromium, nitric acid should not be used since this will dissolve out the catalytic metal from the alumina. In such case, a reagent such as ammonium acetate which will dissolve the lead but not affect the catalyst itself should be used.

If desired, the step of flowing an aqueous flushing solution through the purifier can be carried out concurrently with the vibrating step with the aqueous flushing solution acting also as the entraining fluid.

When an aqueous flushing solution is employed, the solution of the metal compound can be flowed into the purifier with the catalyst still wet. However, superior results are achieved if the catalyst in the purifier is first dried, for example, by air drying.

Reference is now made to the accompanying drawings in which:

FIGURE 1 is a semi-diagrammatic view of a typical catalytic exhaust purifier showing the catalyst bed being treated with a solution of a catalyst metal in accordance with this invention;

FIGURE 2 is a semi-diagrammatic view of the purifier of FIGURE 1 in contact with a vibrator.

A typical catalytic exhaust purifier 2 employed with an automobile, and which is typical of catalytic exhaust purifiers in connection with which this invention is useful, is shown in FIGURES 1 and 2. Referring particularly to FIGURE 1, the exhaust purifier 2 has a casing 4 to which end portions 6 and 8 are flanged. A catalyst bed indicated at B is contained between foraminous grids 10 and 12 which are supported on baffle plates 14 and 16.

End portion 6 is connected to a venturi air inspirator indicated at 20 and which is supplied with air by a conduit indicated at 22. An air filter 24 is attached to conduit 22. A pipe 26 connects the air inspirator 20 to the manifold of the automobile's gasoline engine (not shown).

The exhaust gases passing through purifier 2 are exhausted through a pipe 28 connected to end portion 8. Pipe 28 is provided with a valve indicated at 30.

End portion 6 is provided with a liquid discharge pipe 32 which has a threaded end 33 to which is secured a threaded cap 34. Cap 34 is connected to purifier 2 by a chain indicated at 36. Below catalyst bed B there is provided an additional liquid line 38 which has a threaded end 39. A cap 40 is adapted to close off pipe 38 and is secured to the purifier 2 by means of a chain 42.

Pipes 26 and 28 are secured by metal straps 43 to the automobile frame member 44 by bolts inlicated at 45. As is customary in such a construction, strap 43 will permit a substantial amount of vibration of purifier 2 independent of the chassis of the automobile.

A conventional vibrator 46 is brought into contact with purifier 2 at 47.

In order to initiate the process in accordance with this invention, vibrator 46 is activated to vibrate the exhaust purifier 2. Advantageously, air cleaner 24 is removed and an air hose 48 is attached to conduit 22. Pipe 26 is blocked off conveniently by valve indicated at 50. At the same time cap 34 is secured to pipe 32 and cap 40 is removed from pipe 38. If desired, valve 30 is placed in the open position to permit the air to exhaust through pipe 28 as well as through pipe 38. As the vibration dislodges the dust and chips of the lead compounds the air passing through the exhaust purifier from air hose 48 entrains the dust and chips and carries them either through line 38 or pipe 28 to the atmosphere. While no part of this invention, it is desirable to provide a dust collector to which the pipes carrying the entrained material can be connected.

After carrying out this operation for a sufficient period of time to remove the dust and particles of the lead compounds, valve 30 is closed and a liquid supply hose 52 is connected to pipe 38 and cap 34 is removed from pipe 32. If a flushing liquid is to be employed it is then passed through line 52 by a pump or other suitable means to fill up the interior of the purifier 2, overflow baffle 14 and flow downwardly to be exhausted through pipe 32. After passing a sufficient amount of the flushing liquid through purifier 2, hose 52 is removed to permit the drainage of the flushing liquid from the interior of the purifier.

The solution of the catalyst metal is introduced through hose 52 when it is attached to pipe 38. The solution is flowed into the interior of purifier 2 until it reaches the level of grid 10. It is then permitted to remain within purifier 2 until the catalyst has absorbed a maximum amount of the solution. The remaining solution is then drained by removing hose 52 from pipe 38.

The catalyst is then dried in a reducing gas at a temperature in the range of from about 400° F. to about 1000° F. to reduce the metal compound to the metal per se. The reducing gas can be introduced through conduit 22 or with valve 50 open through pipe 26. It is satisfactory to carry out this operation by passing exhaust gases from the engine of the automobile through pipe 26 and through purifier 2. Before passing the reducing gas through the purifier, caps 34 and 40 are replaced on pipes 32 and 38 respectively and valve 30 is opened. If the reducing gas is introduced through conduit 22, valve 50 will remain in closed position. On the other hand, if the exhaust gases from the engine of the automobile are employed, valve 50 will be opened.

The most advantageous catalysts for use in the catalyst beds to be rejuvenated, for example, catalyst bed B described above, are activated metal oxides, such as activated alumina, activated beryllia, activated magnesia, activated zirconia, activated thoria, or mixtures of such oxides such as a mixture of activated alumina and beryllia, which are impregnated with a catalytically active metal such as platinum, silver, copper, nickel, or combinations of such metals, for example, the combination of copper and chromium. The catalyst bed is preferably made of pellets of the impregnated metal oxides.

*Example I*

An automobile purifier of the type shown in the drawings and described above contained catalyst pellets formed from alumina impregnated with copper and chromium, the catalysts having been operated for 10,000 miles. The purifier was vibrated at 3600 vibrations per minute at an amplitude varying from .0005" to .0020" for 25 minutes with the dislodged dust and particles being removed by passing air through the purifier. A solution having the following composition was then brought into contact with the catalyst bed:

363 gms. Cu(NO$_3$)$_2$·3H$_2$O
150 gms. CrO$_3$
Water Q.S. 1 liter

After maintaining the solution in contact with the catalyst bed for 5 minutes the solution was drained from the purifier. The catalyst was then dried by passing the exhaust gases from the automobile engine through the purifier while driving the car on the road for one hour.

*Example II*

An automobile purifier of the type shown in the drawings and described above contained catalyst pellets formed from alumina impregnated with copper and chromium, the catalyst having been operated for 10,000 miles. The purifier was vibrated at 3600 vibrations per minute at an amplitude varying from .0005" to .0020" for 25 minutes with the dislodged dust and particles being removed by passing air through the purifier. An aqueous ammonium acetate solution (10% by weight of ammonium acetate) at a temperature of 175° F. was then flowed into the purifier until the solution rose to the top of the catalyst bed. After permitting the ammonium acetate solution to remain in the purifier for 15 minutes it was drained and the interior of the purifier was flushed with hot water.

A solution having the following composition was then brought into contact with the catalyst bed:

363 gms. Cu(NO$_3$)$_2$·3H$_2$O
150 gms. CrO$_3$
Water Q.S. 1 liter

After maintaining the solution in contact with the catalyst bed for 5 minutes the solution was drained from the purifier. The catalyst was then dried by passing the exhaust gases from the automobile engine through the purifier while driving the car on the road for one hour.

*Example III*

Typical solutions of catalyst metals are given below:
(*a*) For use with a catalyst employing chromium, a 1.5 molar aqueous solution of CrO$_3$.
(*b*) For use with a catalyst employing silver and chromium, a 1.5 molar silver nitrate and a 1.5 molar chromium nitrate aqueous solution.
(*c*) for use with a catalyst employing iron and chromium, a 1.5 molar ferric nitrate and a 1.5 molar chromium trioxide aqueous solution.
(*d*) For use with a catalyst employing platinum, a 0.1 molar chloroplatinic acid.
(*e*) For use with a catalyst employing palladium, a 0.3 molar palladium chloride aqueous solution.
(*f*) For use with a catalyst employing rhodium, a 0.3 molar rhodium chloride aqueous solution.

What is claimed is:

1. The method of rejuvenating a catalytic exhaust purifier employed with an internal combustion engine operated on leaded gasoline and containing a bed of catalyst pellets of activated metal oxide impregnated with a catalytically active metal comprising: vibrating the purifier and contained bed at a frequency in the range of from about 60 to about 9000 vibrations per minute with an amplitude in the range of from about 1/1000" to about 1/3" to dislodge dust and particles of lead compounds from the catalyst and internal structural parts of the purifier, passing a fluid through the interior of the purifier and through the bed of catalyst pellets during the vibrating to entrain the said dust and particles and exhaust them from the purifier, flowing into the catalyst bed a solution of a salt of the metal with which the metal oxide is impregnated and soaking the catalyst pellets with said solution, and decomposing the salt introduced to the catalyst pellets by the said solution by passing a reducing gas at a temperature of from about 400° F. to about 1000° F. through the catalyst bed in the purifier.

2. The method of claim 1 characterized in that the exhaust purifier and its contained bed of catalyst pellets is vibrated at a frequency in the range of from about 60 to about 9000 vibrations per minute with an amplitude in the range of from about 1/1000" to about 1/3" during said soaking.

3. The method of claim 1 characterized in that the reducing gas is exhaust gas from the engine with which the purifier is employed.

4. The method of claim 1 characterized in that the fluid is a gas.

5. The method of claim 1 characterized in that the fluid is a liquid.

6. The method of rejuvenating a catalytic exhaust purifier employed with an internal combustion engine operated on leaded gasoline and containing a bed of catalyst pellets of activated metal oxide impregnated with copper and chromium comprising: vibrating the purifier and contained bed at a frequency in the range of from about 60 to about 9000 vibrations per minute with an amplitude in the range of from about 1/1000" to about 1/3" to dislodge dust and particles of lead compounds from the catalyst and internal structural parts of the purifier, passing a fluid through the interior of the purifier and through the bed of catalyst pellets during the vibrating to entrain the said dust and particles and exhaust them from the purifier, flowing into the catalyst bed an aqueous solution of a water-soluble salt of copper and of a water-soluble salt of chromium and soaking the catalyst pellets with said solution, and decomposing the copper and chromium salts introduced to the catalyst pellets by the said aqueous solution by passing a reducing gas at a temperature of from about 400° F. to about 1000° F. through the catalyst bed in the purifier.

7. The method of claim 6 characterized in that the salts are nitrate.

8. The method of claim 6 characterized in that the salts are sulphates.

9. The method of claim 6 characterized in that the salts are chlorides.

10. The method of claim 6 characterized in that the exhaust purifier and its contained bed of catalyst pellets is vibrated at a frequency in the range of from about 60 to about 9000 vibrations per minute with an amplitude in the range of from about 1/1000" to about 1/3" during said soaking.

11. The method of claim 6 characterized in that the reducing gas is exhaust gas from the engine with which the purifier is employed.

12. The method of claim 6 characterized in that the fluid is a gas.

13. The method of claim 6 characterized in that the fluid is a liquid.

References Cited in the file of this patent

UNITED STATES PATENTS

| | | |
|---|---|---|
| 1,936,154 | Carter | Nov. 21, 1933 |
| 2,330,174 | Hachmuth | Sept. 21, 1943 |
| 2,867,497 | Houdry et al. | Jan. 6, 1959 |